United States Patent [19]

Friedman et al.

[11] 4,256,565
[45] Mar. 17, 1981

[54] METHOD OF PRODUCING OLEFINS FROM HYDROCARBONS

[75] Inventors: Joseph Friedman, Encino; William S. Hines, Thousand Oaks; Frederick D. Raniere, Northridge; Jacob Silverman, Woodland Hills, all of Calif.

[73] Assignee: Rockwell International Corporation, El Segundo, Calif.

[21] Appl. No.: 93,423

[22] Filed: Nov. 13, 1979

[51] Int. Cl.³ .............................................. C10G 9/36
[52] U.S. Cl. .................................... 208/129; 208/130; 585/650; 585/652
[58] Field of Search ................ 208/129, 130; 585/650, 585/652

[56] References Cited

U.S. PATENT DOCUMENTS

| | | | |
|---|---|---|---|
| 2,767,233 | 10/1956 | Mullen et al. | 585/541 |
| 2,813,138 | 11/1957 | MacQueen | 585/652 |
| 2,912,475 | 11/1959 | Krause et al. | 585/539 |
| 3,842,138 | 10/1974 | Chahvekilian et al. | 585/501 |
| 3,855,339 | 12/1974 | Hosoi et al. | 208/130 |

Primary Examiner—Herbert Levine
Attorney, Agent, or Firm—Clark E. DeLarvin; Henry Kolin

[57] ABSTRACT

A method of producing high yields of olefins from hydrocarbon feedstocks which is particularly applicable to heavy hydrocarbons. In accordance with the present method, a stream of gaseous oxygen is introduced into a first reaction zone and a cocurrent flow of hydrogen is introduced about the periphery of the gaseous oxygen stream, the hydrogen being introduced at a temperature at which it will spontaneously react with the oxygen. The hydrogen and oxygen are introduced in amounts to provide a gas stream of reaction products having an average temperature within the range of from about 1,000° to 2,000° C. and which comprises a major amount of hydrogen and a minor amount of water vapor. The gas stream so produced is introduced into a second reaction zone and impinged upon a stream of hydrocarbon which is heated to a temperature in excess of its melting point but below the temperature at which any substantial coke or tar forms. The gas stream is introduced at a high velocity and in an amount to provide a flowing reaction mixture having a temperature within the range of from 800° to 1,800° C. The flowing mixture is maintained at that temperature for a time of from about 1 to 10 milliseconds to form olefins. Thereafter, the flowing mixture is rapidly quenched to arrest the reaction and the olefin products are recovered.

11 Claims, 1 Drawing Figure

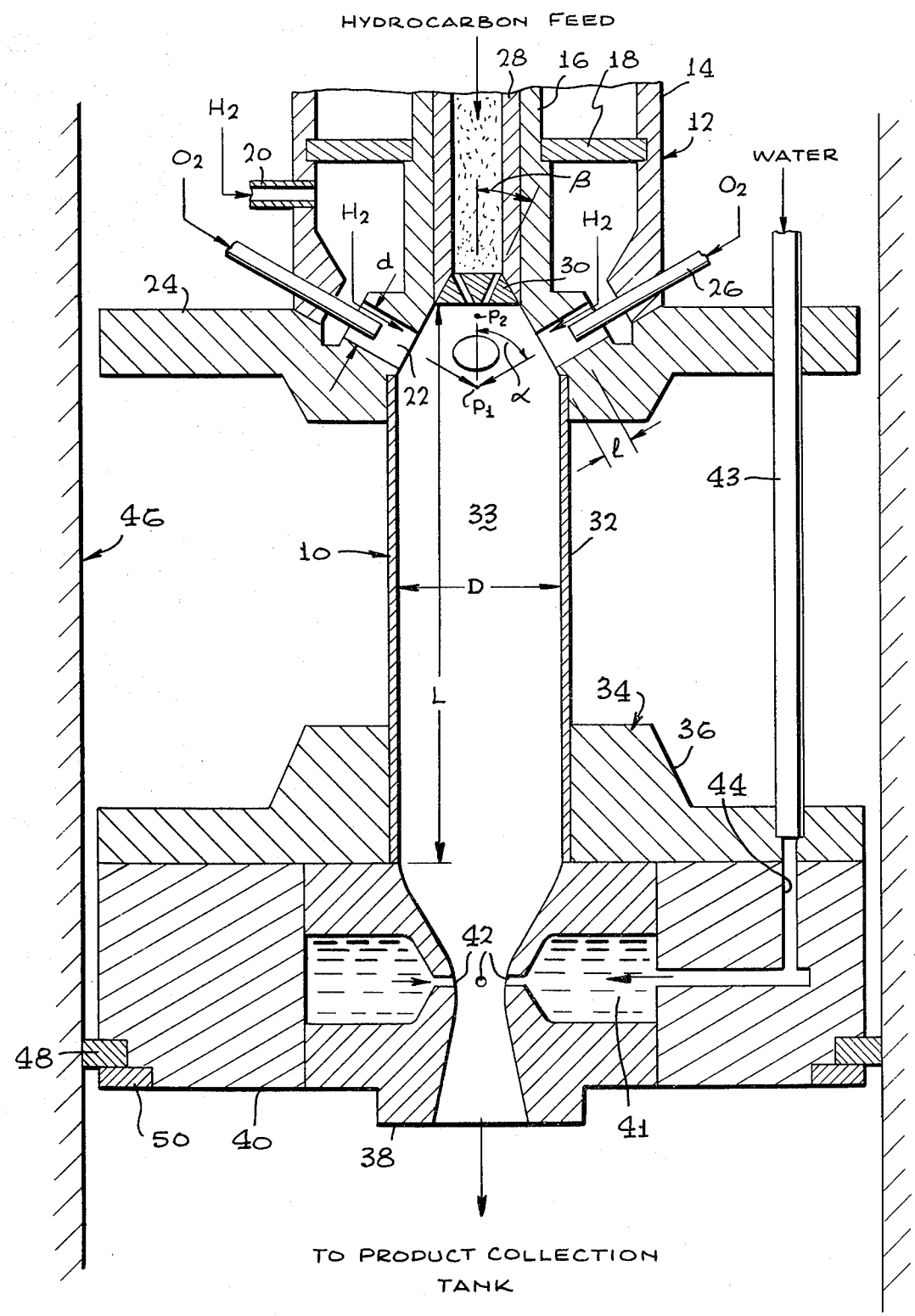

METHOD OF PRODUCING OLEFINS FROM HYDROCARBONS

The present invention broadly relates to the thermal conversion of hydrocarbons in the presence of hydrogen to produce olefins. It particularly relates to the rapid heating, mixing and short residence time thermal cracking of heavy petroleum residues in the presence of hydrogen to produce high yields of olefins.

It is well known that hydrocarbons may be converted to olefins by thermal pyrolysis, generally referred to as steam cracking. In most such prior art processes, the steam is used as the heat transfer fluid to convert gaseous hydrocarbon feedstocks to olefins. In U.S. Pat. No. 2,767,233, there is disclosed a process for the thermal transformation of hydrocarbons. The patent broadly teaches reacting a hydrocarbon with a hot gas stream comprising the combustion products of a fuel and a gaseous oxidant. The patent specifically teaches the introduction of a hydrocarbon reactant into hot combustion gases in an elongated chamber in at least a portion of which the reactant and gases flow at a high velocity of at least 1000 feet per second, and thereafter quickly cooling the reaction gases and recovering the reaction products therefrom. The specific hydrocarbon reactants disclosed are pentane, kerosene, propane and methane for the production of acetylene. The patent also discloses the production of ethylene and synthesis gas from pentane and methane, respectively. In all of the examples, however, it is noted that the feedstock is either a gas or a light, readily vaporizable hydrocarbon. Thus, the patent contains no teaching or suggestion of a method of producing olefins from heavy hydrocarbon feedstocks.

U.S. Pat. No. 2,912,475 relates to the manufacture of low molecular weight unsaturated hydrocarbons (olefins). The patent discloses a process wherein a stream of hot combustion gases is mixed with a secondary lower temperature gas stream containing steam or hydrogen and which is free of any molecular oxygen. Thereafter, the combined stream is passed through a restricted opening into a reaction zone wherein the gas stream is contacted with a hydrocarbon to pyrolyze the hydrocarbon and form the desired olefin product. The patent broadly suggests that heavy hydrocarbons could be used as the feedstock; however, the examples are all restricted to the prior art lighter hydrocarbons. This patent is deficient in that it does not teach a process for producing high yields of olefins from heavy petroleum feedstocks.

More recently, in U.S. Pat. No. 3,842,138, there is disclosed a method of cracking hydrocarbons under hydrogen pressure for the production of olefins. In accordance with the teaching of this patent, the process is conducted in a heated reactor under superatmospheric pressure in the presence of hydrogen in temperatures higher than about 625° C. and with a residence time within the reaction section of less than about 0.5 seconds. This patent discloses the use of a variety of light hydrocarbon feedstocks suitable for use in the described process. However, the patent clearly teaches that aromatics are not desirable in substantial quantity in the feedstock and states that since, ". . . their nuclei have great thermal stability and are relatively refractory to the action of hydrogen under the operating conditions, their presence in the feed is only tolerated, . . . ." Thus, this patent recognizes the problems inherent with thermal cracking of heavy petroleum feedstocks but fails to offer any teaching or suggestion as to how to overcome these difficulties.

Thus, it is seen that the prior art conversion techniques generally require the use of light hydrocarbon feedstocks for the production of olefins. However, in view of the diminishing supply of such feedstocks and their increasing costs, it would be beneficial if there were a process for the production of olefins from heavier hydrocarbon feedstocks such as petroleum residua or the like. This is particularly true since, with the increasing usage of heavy petroleum crudes, an ever increasing amount of such residua is available at relatively low cost and the presently available uses for such residua are very limited.

In accordance with the present invention, there is provided a method for the production of high yields of olefins from hydrocarbon feedstocks. It is a particular advantage of the present invention that the method is not limited to the use of prior art light hydrocarbon feedstocks such as ethane, naphtha, methane, propane and light gas oils. Indeed, the present invention can effectively utilize heavy aromatic as well as aliphatic feedstocks, including such heavy hydrocarbon feedstocks as those having pour points of from about −5° to 150° C. or higher. Thus, the method of the present invention is applicable not only to the prior art feedstocks but hydrocarbon streams heretofore considered of minimal value such as asphalt, syncrude liquids and tars, shale oil, and other low value hydrocarbon liquids or meltable solids.

Particularly preferred feedstocks are those containing a major amount of aromatic constituents such as petroleum residua, asphalts and heavy gas oils.

In accordance with the present invention, it has been found that not only the reaction time but also the heating and cooling rates are critical to the formation of high yields of olefins. Specifically, it has been found that the hydrocarbon must be heated at a rate of at least 200,000° C. per second and subsequently cooled at an equally rapid rate in order to achieve enhanced olefin yields. In accordance with the present method, there are provided first and second reaction zones immediately adjacent to and in flow communication with one another. A stream of gaseous oxygen is introduced into a central portion of the first reaction zone and a cocurrent flow of hydrogen introduced about the periphery of the stream of gaseous oxygen. The hydrogen and oxygen are reacted with one another. The hydrogen and oxygen are introduced in amounts to provide a gas stream of reaction products having an average temperature within the range of from 1,000° to 2,000° C. and comprising a major amount of hydrogen and a minor amount of water vapor. This temperature range is sufficient to provide the necessary rapid heating rate. Excess hydrogen gas provides a superior heat transfer fluid for subsequent rapid pyrolysis.

A selected hydrocarbon feedstock is heated to a temperature in excess of its melting point but below the temperature at which any substantial coke or tar forms, and is introduced into the second reaction zone. Concurrently, the gaseous stream from the first reaction zone also is introduced into the second reaction zone in such a manner that the two streams impinge upon one another at an included half angle $\alpha$ of from 25° to 45°. It is an essential feature of the present invention that the gas stream is introduced at a velocity at least four times greater than that of the hydrocarbon, and the hydrocarbon is injected through an orifice to form a spray of droplets having a median diameter of less than about 100 microns, whereby the hydrocarbon and heated gas rapidly mix and the hydrocarbon is heated at a rate in excess of 200,000° C. per second. Upstream self-impingement of the hydrocarbon stream has been used to improve liquid atomization. By so doing, there is provided in a time of less than 2 milliseconds a flowing reaction mixture having a temperature within the range of from 800° to 1800° C. The flowing reaction mixture is maintained at that temperature for a time of from 1 to 10 milliseconds. Thereafter, the reaction mixture is rapidly quenched to prevent decomposition and/or saturation of the olefins formed and undesirable side reactions. Preferably, the quenching is accomplished by passing the mixture through a converging-diverging nozzle to aerodynamically cool the mixture. Advantageously, a cooling fluid also is injected into a downstream portion of the nozzle to facilitate the rapid quench requirements. It also is an essential feature of the present invention that the mixture be cooled to a temperature of less than about 600° C. and preferably less than 400° C. in a time of less than 2 milliseconds. Following the quench, the desired olefin products are recovered by standard gas separation techniques.

The sole FIGURE is an elevation view in cross section of an apparatus for use in the present invention.

The present invention provides a method for obtaining enhanced yields of olefins from hydrocarbon feedstocks. The method of the present invention is readily amenable for use with light hydrocarbons, including those used heretofore, such as naphtha, light gas oil, propane, pentane, ethane, and the like. It is a particular advantage of the present invention that the heavier hydrocarbon feedstocks heretofore considered of minimal value for the production of olefins also are utilizable. The term "heavy hydrocarbon feedstocks" as used herein comprises those hydrocarbons having a normal pour point within the range of from about −5° to 150° C. and which generally are derived from refining operations. As those versed in the art will appreciate, the "pour point" is readily determinable by following the procedures established by the American Society for Testing Materials.

When heavy hydrocarbon feedstocks are used, they are first preheated to a temperature at which they flow freely but which is below the temperature at which gum and coke formation becomes a problem in the liquid feed system. Thus, from both a liquid transport and thermodynamic consideration, the oil advantageously is preheated to as high a temperature as possible before injection. This temperature will typically be in the range of from 200° to 350° C., depending upon the particular heavy hydrocarbon being processed.

Referring now to the sole FIGURE, therein is depicted in cross section an apparatus suitable for use in accordance with the process of the present invention. Broadly, the apparatus comprises a reactor assembly generally designated as 10. Adjacent the upper end of reactor assembly 10 there is provided an injector assembly 12 which in this particularly preferred embodiment comprises substantially cyclindrical outer wall members 14, inner wall members 16, and a plate member 18 which cooperate to form a manifold for receiving hydrogen from an inlet 20. Injector assembly 12 further includes a plate member 24 which together with inner wall member 16 define a first reaction zone 22. In this preferred embodiment, there is an array of four such first reaction zones 22. Each of said reaction zones also is provided with a conduit member 26 for the introduction of oxygen into a central portion thereof. Each of the reaction zones 22 are sized to provide a length (l) to diameter (d) ratio within the range of from about 2:1 to 3:1. Injector assembly 12 also includes a hydrocarbon feed conduit 28 for the introduction of hydrocarbon into the reactor. In the preferred embodiment shown, hydrocarbon feed conduit 28 terminates in a plate 30 provided with a plurality of orifices arranged to impinge upon one another at an angle $\beta$ which is within the range of from about 25° to 45°; an angle of 30° being particularly preferred.

Reactor assembly 10 also includes a housing 32 which terminates at one end in injector assembly 12 and at the other end in a quench assembly 34. For convenience of manufacture as shown, quench assembly 34 comprises an upper plate member 36, a nozzle-forming member 38 and a ring member 40. Nozzle-forming member 38 is shaped to provide an isentropic deLaval nozzle to provide, under normal operating conditions, substantially sonic velocity at the throat thereof, i.e., from 85% to 100% of sonic velocity at the throat. The specific shape and configuration for such a nozzle is well known and readily within the skill of one versed in the art. Advantageously, nozzle-forming member 38 is provided with a coolant fluid manifold 41 for the introduction of a cooling fluid through a plurality of orifices 42 located about the periphery of the throat area of the deLaval nozzle. Cooling fluid is provided to manifold 41 through a conduit member 43 and coolant fluid passageways 44 located in members 36, 38 and 40. For certain applications, it may be preferred to quench solely with a coolant fluid. The use of a nozzle, however, has the advantage of minimizing or eliminating dilution of the reaction products.

In the particular embodiment shown, reactor assembly 10 is contained within a pressure vessel 46 such that the pressure within and without reactor assembly 10 may be maintained at substantially the same level. Thus, during operation, reactor assembly 10 is subjected to very little stress as a result of pressure differential and hence can be operated at higher temperatures and pressure than would otherwise be possible when using conventional materials of construction. In this embodiment, reactor assembly 10 further includes a biasing or locating member 48, which is retained in place by a retainer member 50 to ensure that reactor assembly 10 remains substantially in a desired orientation within pressure vessel 46. In this embodiment, an upper end of reactor assembly 10 (not shown) is the only rigid attachment. Thus, reactor assembly 10 is free to move linearly within pressure vessel 46 as a result of thermal expansion or contraction.

In operation, oxygen is introduced through conduit 26 into first reaction zone 22. Concurrently, hydrogen is introduced through conduit 20 into first reaction zone 22 about the periphery of the gaseous oxygen stream. The hydrogen is preheated to a temperature of from about 250° to 1,200° C. and preferably 500° to 800° C., whereby the hydrogen and oxygen react spontaneously to form a high temperature gas stream comprising a major amount of hydrogen and a minor amount of water vapor resulting from the reaction. In some applications, it may be advantageous to introduce the hydrogen at a lower temperature and initiate the reaction with a catalyst.

Advantageously, the oxygen and hydrogen are introduced into first reaction zone 22 in amounts to provide a weight ratio of hydrogen to oxygen within the range of from about 0.8:1 to 1.6:1 and preferably within the range of from about 1:1 to 1.4:1. Such ratios will provide a gas stream having the desired temperature, namely, a temperature of from about 1,000° to 2,000° C. A preferred temperature is within the range of from about 1,400° to 1,800° C.

The total amount of hydrogen and oxygen introduced into the first reaction zone will depend, of course, upon the rate at which the hydrocarbon is to be introduced and the reaction temperature desired. The reaction temperature generally is selected to be within the range of from about 800° to 1,800° C. and particularly good yields of olefins are obtained at temperatures within the range of from about 1,200° to 1,400° C. The lower temperature of 800° C. is the limit of acceptable pyrolysis rates and 1,800° C. is considered to be a maximum practical temperature due to structural and economic constraints. Specifically, higher temperatures might provide improved yields but would also require the use of special materials of construction, such as ceramics, special alloys and the like, to withstand such temperatures.

The oxygen is introduced into first reaction zone 22 at a velocity within the range of from about 5 to 40 meters per second and preferably within the range of from about 10 to 25 meters per second. The hydrogen, which is introduced concurrently and peripherally about the oxygen stream should have a substantially higher velocity. Typically, the hydrogen will be introduced at a velocity of from about 75 to 400 meters per second. Particularly good results are obtained when the hydrogen velocity is within the range of from about 100 to 250 meters per second. The diameter of the first reaction zone or cross-sectional flow area should be such as to provide an exit gas velocity (assuming complete combustion of the oxygen) of from about 150 to 250 meters per second. While available data from rocket engine test programs would indicate that atomization of the hydrocarbon would be favored by a higher gas velocity, it has been found that higher velocities move the combustion flame downstream into the second reaction zone. This results in free oxygen in the second reaction zone which tends to preferentially react with the hydrocarbon which, in turn, results in undesirable side reactions and a reduction in the yield of olefin product.

The stream of high temperature gaseous products from first reaction zone 22 is introduced into second reaction zone 33 where it is impinged upon one or more streams of the heated hydrocarbon feedstock. The stream of heated hydrogen and the hot hydrocarbon stream are impinged at an included angle of $\alpha$ of from 25° to 45°, with an angle of about 30° being particularly preferred. In addition, the spacings of the openings into a second reaction zone 33 should be such that the streams impinge at a point $p_1$ which generally is a distance of from about 5 to 12 times diameter d from the point of introduction of the streams into reaction zone 33. Ordinarily this distance will be from 1 to 6 cm and preferably is less than 4 cm.

It is a particularly significant feature of the present invention that the ratio of the velocity of the gas streams to that of the heated hydrocarbon be in excess of about 4. Specifically, to comply with the foregoing parameters, namely, a hot gas stream velocity within the range of from 100 to 250 meters per second, the hot hydrocarbon should be injected at a velocity of from about 10 to 25 meters per second. These geometric and gas velocity specifications ensure high quality mixing and the required ultra-rapid heating of the hydrocarbon feedstock. In the particularly preferred embodiment shown, the heated hydrocarbon is introduced through plate member 30 through a plurality of orifices which are arranged to impinge upon one another at a point $p_2$ which is upstream of $p_1$. The self impingement of the hydrocarbon stream has been found to improve liquid atomization. In addition, the individual orifices are sized to provide a fine spray of the heated hydrocarbon.

The length L and cross-sectional area (the diameter D for a cylindrical reactor) of second reaction zone 33 should be sized such that the mixture of hot hydrocarbon and gas will have a residence time within second reaction zone 33 within the range of from 1 to 10 milliseconds and preferably from 1 to 7 milliseconds while flowing at an average velocity within the range of from about 40 to 80 meters per second. The ratio between the amount of gas and the amount of hot hydrocarbon preferably will be adjusted to provide a reaction temperature within the range of from about 1,000° to 1,400° C. This is readily accomplished by adjusting the flow rate, ratio of hydrocarbon to hydrogen and oxygen, or varying the preheat as desired. Again, this preferred reaction temperature range has been found to be the most practical within the constraints of reaction rates and structural and economic considerations.

The velocity difference between the hydrocarbon and hot gas stream and the atomization of the hydrocarbon droplets provides a high heating rate which has been found to be required in accordance with the present invention. Specifically, the hot gas velocity, being much higher than that of the velocity of the entrained liquid droplets, produces a high shear, which, in turn, results in both a high heat transfer coefficient between the droplets and the gas, and in a still further breakup of the droplet size. This produces a combination of high film coefficient and high surface area for the small droplets which results in an extremely rapid vaporization and heatup of the hydrocarbon to the desired reaction temperature. Thus, in accordance with the present invention, heating rates within the range of from 200,000° C. to as much as 800,000° C. per second or more are obtainable.

Immediately downstream of second reaction zone 33 there is provided a converging-diverging isentropic deLaval nozzle. In the converging section, the gases are accelerated to sonic velocity with a resulting cooling effect of from 150° to 200° C. to arrest or minimize secondary decomposition reactions which otherwise would occur. Downstream of or adjacent to the throat of the nozzle, there optionally is provided means for injection of a spray of a cooling fluid such as hydrogen, water or a hydrocarbon.

The injectors for the cooling fluid preferably comprise an array of radially inwardly directed nozzles or orifices. The reduction of cross-sectional area at the nozzle throat simplifies the positioning of the injector to give complete and uniform coverage of the gas stream while the high gas velocities accelerate the atomization and vaporization of the coolant fluid, to quench the gas to a temperature below 600° C.; preferably to below 400° C. The combined aerodynamic and spray quenching readily reduces the temperature to the desired amount in from 1 to 2 milliseconds, thus arresting the reaction and providing high yields of the desired olefin products. Particularly good yields of olefins are obtained when the combined time for heatup, reaction and quench is accomplished in less than about 5 milliseconds.

The effluent from the quench zone may be separated and purified by any of various techniques for the recovery of individual products, such as by distillation, absorption, gravity separation and the like, typical of olefin plant operations. Heavy liquid, light saturated gases (e.g., ethane) and hydrogen preferably are all recycled back to the reactor to improve overall process yields. Recoverable olefins and petrochemicals include acetylene, ethylene, propylene, butylenes, butadiene, aromatics such as benzene, toluene, xylenes, styrene and other hydrocarbons such as propane and butane. Methane produced can be recycled with the hydrogen and reformed to furnish the necessary make-up hydrogen. Thus, it is seen that the hydrogen utilized in the present invention need not be pure. Indeed, in addition to the recycled hydrocarbons, it may be desirable in some instances to add high temperature steam or a heated inert gas to the first reaction zone to reduce the hydrogen requirements.

for a time of less than 5 milliseconds. Pressure does not seem to affect the yeild of olefins obtained in accordance with the present invention, at least within the range of from about 100 to 1,000 psi. However, for convenience in processing the various streams, it generally is preferred to maintain the reaction zone pressure within the range of from about 300 to 500 psi.

TABLE

RESIDUAL OIL CONVERSIONS FOR RESIDENCE TIMES LESS THAN 5 MILLISECONDS

| Feedstock | Run | Sample | Temp. (° C.) | Press. (psig) | Resid. Time (ms) | Weight Fraction of Oil Converted to | | | | | | |
|---|---|---|---|---|---|---|---|---|---|---|---|---|
| | | | | | | $C_2H_4$ | $C_6H_6$ | $C_7H_8$ | $C_2H_6$ | $C_3H_6$ | $CH_4$ | $CO$ |
| Bunker C | 57 | 1 | 1111 | 445 | 4.1 | .155 | .066 | .009 | .083 | .013 | .298 | .005 |
| Spec. Grav. - 0.971 | | 2 | 1106 | 449 | 4.2 | .149 | .057 | .011 | .095 | .018 | .270 | .005 |
| Sulfur 1.37 wt. % | | 3 | 1104 | 450 | 4.2 | .159 | .059 | .012 | .120 | .020 | .277 | .005 |
| Pour Point - 11° C. | | 4 | 1093 | 453 | 4.3 | .159 | .055 | .012 | .122 | .020 | .274 | .003 |
| H/C* = 1.6 | | | | | | | | | | | | |
| Vacuum Residual | 59 | 1 | 1084 | 397 | 3.9 | .060 | .0087 | .0029 | .035 | .023 | .056 | .0006 |
| Vacuum Residual | 60 | 1 | 1051 | 403 | 3.9 | .156 | .023 | .005 | .070 | .049 | .126 | .002 |
| Spec. Grav. - 0.996 | | 2 | 992 | 414 | 4.2 | .035 | .006 | .001 | .011 | .011 | .037 | .001 |
| Sulfur 3.49 wt. % | | 3 | 1020 | 394 | 3.7 | .017 | .003 | .000 | .004 | .003 | .034 | .000 |
| Pour Point - 56° C. | | | | | | | | | | | | |
| H/C = 1.42 | | | | | | | | | | | | |
| Vacuum Residual | 61 | 1 | 1185 | 314 | 3.0 | .167 | .047 | .005 | .054 | .004 | .285 | .016 |
| Spec. Grav. - 0.996 | | 2 | 1188 | 340 | 3.2 | .152 | .047 | .005 | .063 | .0086 | .240 | .007 |
| Sulfur 3.49 wt. % | | 3 | 1171 | 354 | 3.4 | .128 | .021 | .006 | .039 | .048 | .113 | .008 |
| Pour Point - 56° C. | | 4 | 1166 | 356 | 3.3 | .107 | 0.18 | .003 | .036 | .030 | .105 | .008 |
| H/C* = 1.42 | | | | | | | | | | | | |
| Heavy Gas Oil | 62 | 1 | 1154 | 345 | 3.1 | .257 | .074 | .012 | .117 | .006 | .375 | .012 |
| Spec. Grav. - 0.842 | | 2 | 1133 | 352 | 3.2 | .221 | .067 | .011 | .115 | .000 | .322 | .013 |
| Sulfur 0.23 wt. % | | 3 | 1044 | 345 | 3.3 | .180 | .049 | .015 | .189 | .010 | .235 | .013 |
| Pour Point - 1° C. | | 4 | 1037 | 348 | 3.3 | .203 | .055 | .019 | .213 | .050 | .249 | .013 |
| H/C* = 1.86 | | | | | | | | | | | | |
| Atmospheric Residual | 63 | 1 | 1094 | 326 | 3.1 | .177 | .038 | .008 | .113 | .013 | .202 | .0055 |
| Spec. Grav. - 0.946 | | 2 | 1062 | 332 | 3.2 | .158 | .028 | .010 | .101 | .040 | .150 | .010 |
| Sulfur 2.12 wt. % | | 3 | 1175 | 386 | 3.5 | .145 | .064 | .005 | .050 | .000 | .354 | .004 |
| Pour Point - 18° C. | | 4 | 1194 | 384 | 3.4 | .147 | .061 | .003 | .040 | .000 | .340 | .004 |
| H/C* = 1.62 | | | | | | | | | | | | |

*Atomic Hydrogen-to-Carbon ratio

EXAMPLE

A series of tests were performed to demonstrate the utility of the present method. The results of these tests are set forth in the Table below. The apparatus utilized was substantially the same as that depicted in the drawing. The total times (heatup, reaction and quench) ranged from about 3.0 to 4.3 milliseconds. Five types of oils were used, ranging from a heavy Iranian vacuum residual to a heavy gas oil. The oils were heated to a free-flowing condition (150° to 270° C.) and reacted with hydrogen which had been heated to 1,000° to 1,400° C. with an electrical heater and by combustion with limited amounts of oxygen. The reaction mixture is maintained at a reaction temperature ranging from 900° to 1,300° C. and pressures ranging from 314 to 453 psia for a time of less than 5 milliseconds.

The reaction products leaving the reactor were quenched to a temperature below 400° C. and passed into a settling tank and cyclone separator for separation of gases and condensed phases. The gaseous phase was then passed through a heat exchanger, which cooled it to near ambient temperatures, an array of pressure let down valves, an activated carbon absorption bed and on to a burn stack. Between the heat exchanger and the pressure let down valves, a portion of the product stream was diverted into a bank of high pressure gas sample bottles. Chromatographic analysis of the gases in these bottles provided identification of the gaseous products. A post-test collection was also drawn of liquid products, coke and unreacted oils. Material balances between the oil, hydrogen reactants and the gaseous and condensed phase products permit the conversion of reactant oil to useful lighter hydrocarbons to be calculated. In the Table, residence time includes heatup and quench times.

From the foregoing Table, several significant features will be noted. For example, conversion to olefins (ethylene and propylene) of 15 to 25% of the oil feedstock was obtained in a single pass through the reactor. Also, promising conversions (up to 8% to light aromatics (benzene and toluene) were obtained. In addition to the olefinic and light aromatic yields, up to 35 to 50% conversion of oil to light aliphatics (methane and ethane) were simultaneously achieved. Thus, it is seen that total oil conversions of 55 to 80% into useful gas products were obtained, thereby demonstrating the efficacy of the present invention for commercial applications. Tests also were run under substantially similar conditions, but with total (heatup, residence and cooling) times ranging from 10.9 milliseconds to 19.2 milliseconds. However, at such longer times, it was found that less than 10% of the feedstock was converted to the desired olefin products. Thus, this example demonstrates the importance of rapid heating, short residence times and rapid cooling to obtain significant yields of olefins from heavy hydrocarbons.

It also must be appreciated that in the foregoing example, there was no recycle of the more readily crackable products such as ethane, propane, light gas oils and the like. In the prior art wherein the lighter hydrocarbon feedstocks are used and the uncracked or partially cracked effluent is recycled, much higher yields are obtainable. For example, in commericial operating plants today wherein pure ethane is used as feedstock, yields as high as about 75% are obtainable. For those commerical plants using naptha, yields of about 32% are obtained and for those few plants utilizing light gas oil, yields as high as about 28% are obtained. Referring again to the Table, and Sample 1 from Run 62 in particular, using a heavy gas oil, 26% conversion of the gas oil to ethylene was obtained in a single pass. If the other light readily crackable fractions were recycled, ultimate conversion of as much as 30 to 50% of the heavy gas oil to ethylene could be anticipated.

While the present invention has been described in terms of specific examples and what is now considered its best mode of practice, it will be appreciated by those skilled in the art that various changes and modifications are possible which will not depart from the spirit or scope of the inventive concepts taught herein. Thus, the invention has been described with respect to certain presently preferred specific operating parameters and as being practiced in the absence of a catalyst. However, it is within the scope of the present invention to add a cracking catalyst if so desired. Indeed, the foregoing description and examples are intended to be illustrative only and should not be construed as limiting the scope of the invention, reference being made to the appended claims for this latter purpose.

What is claimed is:

1. A method for producing high yields of olefins from a hydrocarbon feedstock comprising:
   (a) providing a hydrocarbon at a temperature above its melting point but below the temperature at which any substantial coke or tar forms;
   (b) providing first and second reaction zones immediately adjacent to and in flow communication with one another;
   (c) introducing a stream of gaseous oxygen into a central portion of said first reaction zone;
   (d) introducing a cocurrent flow of hydrogen or hydrogen-containing gas about the periphery of said gaseous oxygen stream in said first reaction zone, reacting said hydrogen and oxygen with one another, said hydrogen and oxygen being introduced in amounts to provide a gas stream of reaction products having an average temperature within the range of from 1,000° to 2,000° C., and which comprise a major amount of hydrogen and a minor amount of water vapor;
   (e) cocurrently introducing the gas stream from said first reaction zone and a finely dispersed spray of said hydrocarbon into said second reaction zone, said spray comprising droplets having a median diameter of less than about 100 microns and said spray being introduced into said reaction zone to impinge upon the gas stream at an included half angle of from 25° to 45°, said gas stream being introduced at a velocity at least four times greater than that of said hydrocarbon and said hydrocarbon and gas being introduced in amounts to provide a heating rate in excess of 200,000° C./sec. to produce in time of less than about 2 milliseconds a flowing reaction mixture having a temperature within the range of from 800° to 1,800° C.;
   (f) maintaining said flowing reaction mixture at said temperature for a time of from about 1 to 10 milliseconds to form enhanced yields of olefins;
   (g) quenching said reaction mixture to a temperature of less than about 600° C. in a time of less than about 2 milliseconds to rapidly arrest said reaction; and
   (h) recovering the olefins formed.

2. The method of claim 1 wherein said hydrocarbon comprises a major amount of aromatic constituents and is selected from the group consisting of petroleum residua, asphalts and heavy gas oils.

3. The method of claim 1 wherein said hydrogen and oxygen introduced into the first reaction zone in step (d) are introduced in an amount to provide a hydrogen/oxygen weight ratio within the range of from 0.8 to 1.6.

4. The method of claim 1 wherein steps (e), (f) and (g) are accomplished in a total time of less than about 5 milliseconds.

5. The method of claim 1 wherein in step (g) the reaction mixture is passed through a converging-diverging nozzle.

6. The method of claim 5 wherein a cooling fluid also is injected into the nozzle intermediate the converging-diverging section.

7. The method of claim 1 wherein the velocity of the gas stream injected into said second reaction zone is within the range of from about 150 to 250 meters per second.

8. A method of producing high yields of olefins from heavy hydrocarbon feedstocks comprising:
   (a) heating a heavy hydrocarbon having a normal pour point within the range of from about −5° to 150° C. to a temperature in excess of its melting point but below the temperature at which any substantial coke or tar forms;
   (b) providing first and second reaction zones immediately adjacent to and in flow communication with one another;
   (c) introducing a stream of gaseous oxygen into a central portion of said first reaction zone at a velocity of from about 5 to 50 meters per second;
   (d) introducing a cocurrent flow of hydrogen or hydrogen-containing gas into said first reaction zone about the periphery of said gaseous oxygen stream, said hydrogen being introduced at a velocity of from about 75 to 400 meters per second and at a temperature within the range of from about 500° to 800° C., whereby said hydrogen and oxygen will rapidly mix and spontaneously react with one another, said hydrogen and oxygen being introduced in a weight ratio of hydrogen to oxygen within the range of from about 0.8 to 1.6, to produce a gas stream of reaction products having an average temperature within the range of from 1,000° to 2,000° C., and which comprises a major amount of hydrogen and a minor amount of water vapor;

(e) cocurrently introducing a stream of heated hydrocarbon and the gas stream produced in step (d) into said second reaction zone, said heated hydrocarbon being introduced as a finely dispersed spray of droplets having a median diameter of less than about 100 microns and a velocity within the range of from 10 to 25 meters per second, said gas stream being introduced at a velocity of from about 150 to 250 meters per second, said hydrocarbon and gaseous stream being introduced to impinge upon one another at an included half angle of from 25° to 45° within a distance of from about 1 to 4 centimeters from their point of injection into the second reaction zone to provide a heating rate in excess of 200,000° C./sec. and produce, in a time of less than about 2 milliseconds, a flowing reaction mixture having a temperature within the range of 800° to 1400° C.;

(f) maintaining said flowing reaction mixture at said temperature for a time of from enanced yields of about 1 to 7 milliseconds to form olefins;

(g) quenching said reaction mixture to rapidly arrest said reaction by passing said mixture through a converging-diverging nozzle and simultaneously introducing a spray of a cooling fluid into said nozzle to reduce the temperature of the reaction mixture to a temperature of less than about 600° C. in about 2 milliseconds; and (h) recovering the olefins formed.

9. The method of claim 8 wherein said hydrocarbon comprises a major amount of aromatic constituents and is selected from the group consisting of petroleum residua, asphalts and heavy gas oils.

10. The method of claim 8 wherein steps e, f, and g are accomplished in a total time of less than about 5 milliseconds.

11. The method of claim 10 wherein a portion of said reaction products are recycled to said second reaction zone.

* * * * *

UNITED STATES PATENT AND TRADEMARK OFFICE
CERTIFICATE OF CORRECTION

PATENT NO. : 4,256,565

DATED : March 17, 1981

INVENTOR(S) : Joseph Friedman et al

It is certified that error appears in the above–identified patent and that said Letters Patent are hereby corrected as shown below:

Column 4, line 4, "(1)" should read --(1)--.

Column 8, line 2, "yeild" should read --yield--.

Column 7, in the Table, under heading $C_6H_6$, for Run 61, Sample 4, "0.18" should read -- .018 --.

Column 10, line 8, (Claim 1), after "produce in" insert --a--.

Column 12, line 2, (Claim 8), delete "enanced yields of";
line 3, after "form" insert --enhanced yields of--.

Signed and Sealed this

Eighteenth Day of August 1981

[SEAL]

Attest:

Attesting Officer

GERALD J. MOSSINGHOFF

Commissioner of Patents and Trademarks